W. B. BRONANDER.
PHONOGRAPH RECORD DIE HOLDER.
APPLICATION FILED JAN. 15, 1920.
1,413,571.  Patented Apr. 25, 1922.
2 SHEETS—SHEET 2.
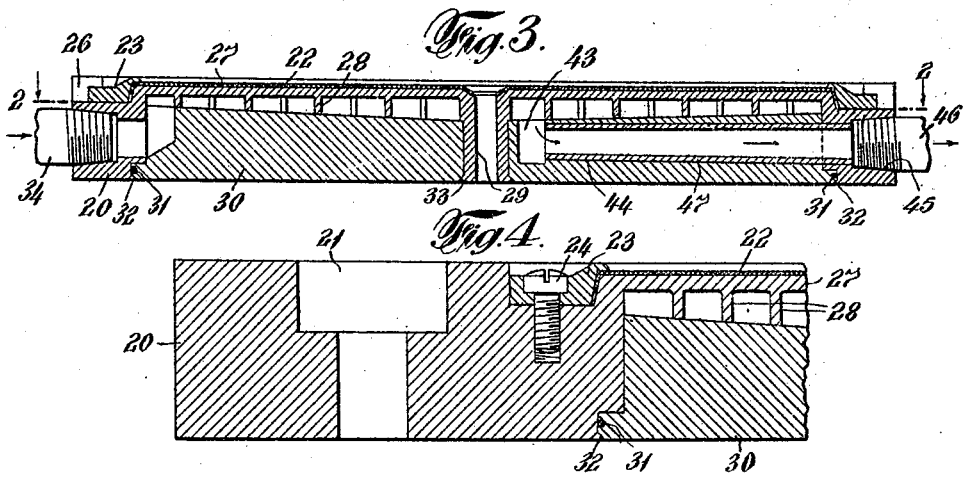
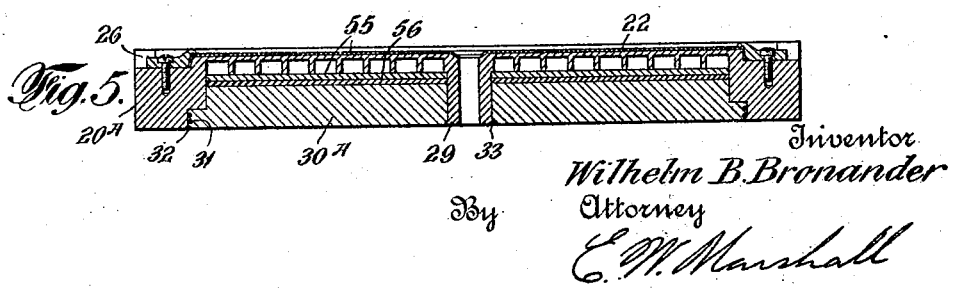
Inventor
Wilhelm B. Bronander
By Attorney
E. W. Marshall

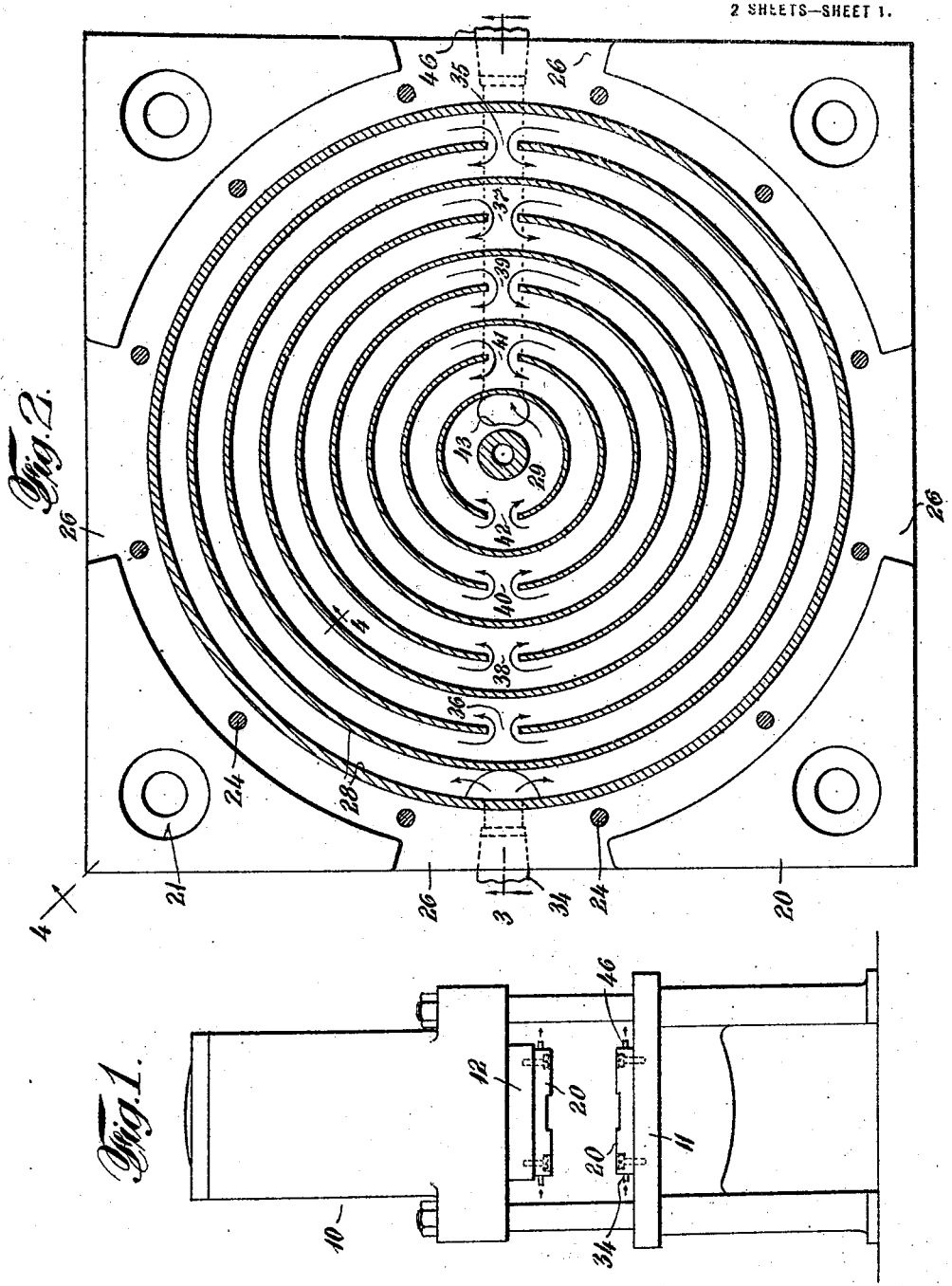

UNITED STATES PATENT OFFICE.

WILHELM B. BRONANDER, OF MONTCLAIR, NEW JERSEY.

PHONOGRAPH-RECORD DIE HOLDER.

1,413,571.   Specification of Letters Patent.   Patented Apr. 25, 1922.

Application filed January 16, 1920. Serial No. 351,900.

*To all whom it may concern:*

Be it known that I, WILHELM B. BRONANDER, a citizen of the United States, and a resident of Montclair, Essex County, and State of New Jersey, have invented certain new and useful Improvements in Phonograph-Record Die Holders, of which the following is a specification, reference being had to the accompanying drawings, forming a part thereof.

My invention relates to phonograph die holders and its object is to provide a simple and effective device for heating and cooling record disks during the process of making them. Another object is to provide an apparatus by means of which the temperature of the material of which the disks are made may be changed quickly but uniformly throughout its mass. In making records of this character the material is pressed between dies while it is heated to make it plastic and is cooled and hardened while held between the dies under pressure. In order to produce perfect records, it is necessary that the mass be kept comparatively soft by maintaining it at a predetermined temperature which must be uniform throughout, until it is formed between the dies. It is then cooled and hardened before the pressure is removed. This operation may be accelerated by artificial cooling, but in order to be effective the cooling must take place uniformly throughout the mass. Consequently, it is desirable to cool the formed records quickly provided this can be accomplished uniformly. By means of this invention this desirable result may be attained.

The aforesaid objects of the invention and other of its objects and advantages will appear in the following specification in which I will describe the invention, and the novel features of which will be set forth in appended claims.

Referring to the drawings:

Figure 1 is a front elevation of a press shown in outline with a pair of my die holders thereon.

Figure 2 is a sectional plan view of a die holder which is made according to and embodies this invention. The section of this figure is taken on line 2—2 of Figure 3.

Figure 3 is a sectional elevation of the same device with a section taken on the line 3—3 of Fig. 2.

Figure 4 is an enlarged sectional elevation of a part of the device with the section on the line 4—4 of Fig. 2.

Fig. 5 is a sectional elevation of a die holder of a modified construction.

Like characters of reference designate corresponding parts in all the figures of the drawings.

10 designates a press in which 11 is the table and 12 the head.

20 is a die or matrix holder at the corners of which are counterbored holes 21 for the reception of bolts by means of which it may be secured to the table or head of the press. The die or matrix 22 is secured to this holder by a ring 23 and screws 24. The uppermost surface of the ring is a distance above the matrix equal to one-half the thickness of the finished record and this distance determines the thickness of the record. The upper surface of the corners of the die holder is flush with the top of the ring, but the holder is cut away as at 26 between its corner portions to allow for the escape of surplus record material, and it is also cut away at this same level inside of the corners to form a seat for the ring.

The part 27 of the holder upon which the matrix rests is somewhat higher than the seat of the ring, and is comparatively thin. From its under surface projects a plurality of concentric ribs 28. These increase progressively in depth toward the center of the holder where there is a hollow boss 29.

30 is a filler plate the under surface of which is parallel with the upper surface of the part 27 and the upper surface of which is beveled to fit tightly against the ribs 28. 31 is a gasket ring and the plate 30 is held in place by spinning the edges of the holder 20 and of the boss 29 under it, as shown at 32 and 33 respectively. Any other means for securing the plate may be used if desired.

34 is an inlet pipe affixed to the holder 20, and this projects through the outer rib 28 as shown in Figs. 2 and 3. The second rib is cut away at 35 at a point diametrically opposite the intake pipe 34, the third rib is cut away at 36 at the point nearest the intake pipe. The fourth rib is cut away at 37. The fifth, sixth, seventh and eighth ribs are similarly cut away at 38, 39, 40 and 41 respectively, and the inner rib is cut away at 42. 43 is an outlet port from the space between the inner rib and the boss 29. A downwardly inclined bore 44 through plate 30 leads to a hole 45 in the holder 20 with which is connected a discharge pipe 46. 47 is a heat insulating lining in the bore 44.

Before specifically describing the structure shown in Fig. 5, I will point out the manner in which this device is used. With a pair of these die holders affixed to the table 11 and the head 12 of the press, as shown in Figure 1, and with a matrix secured to each of the holders steam is admitted through the inlet pipe 34 and allowed to escape through the outlet pipe 46. The path of the steam is shown by the arrows in Figure 2 from which it may be seen that the steam is uniformly distributed throughout the body of the holder so that it is uniformly heated.

When in this condition, the heated record material in its plastic condition is placed upon the lower die holder and the two die holders are brought together under pressure. As has been pointed out surplus material may escape through the openings formed by the parts 26 of the holders. In this manner the record is formed. While thus held under pressure, steam is shut off and cold water introduced through the pipe 34 and allowed to escape through the pipe 46 after passing through the tortuous passages formed in the holder between ribs 28. By this arrangement of the parts the temperature of the die holders may be changed quickly without cooling any one part of it before another. Consequently, the record material is cooled and hardened very quickly so that the press may be operated to separate the die holders almost immediately after they have been brought together.

In order to prevent the heating or cooling of a part of the record material on a radial line over the bore 44, the insulated lining 47 is provided. The increasing depth of the ribs and the relative beveled upper surface of the plate 30 provide for a quick drainage of the water or of the condensed steam, and it is for the same purpose of accelerating the action of the device that the bore 44 is also inclined. It is obvious that the die holders and the material between them can be quickly cooled and also that the die holders and matrices may be as quickly reheated after the record has been removed in readiness for another operation.

In Fig. 5 a construction is shown which differs somewhat from that illustrated in the preceding figures. The ribs on the matrix holder 20^A are of uniform depth and the plate 30^A is made with its upper and lower surfaces parallel. A thin plate 55 of metal is placed against the under edges of the ribs, and a disk 56 of insulating material is interposed between it and the filling plate 30^A.

I have illustrated and described different forms of construction in order to show that this invention is not limited to any specific form or construction, and I intend no limitations other than those imposed by the appended claims.

What I claim is:

1. A die holder having a portion with a surface adapted to hold a matrix, a plurality of spaced ribs depending from the side of said portion opposite the matrix holding surface, forming a tortuous fluid passage, said ribs progressively increasing in depth toward the center of the device, a filler plate abutting against the ribs, an inlet port adapted to introduce heating and cooling fluids connected with the outermost part of said passage, and a downwardly inclined outlet passage from the center of the device to a point opposite the inlet port.

2. A die holder having a portion with a surface adapted to hold a matrix, a plurality of concentric spaced ribs depending from the side of said portion opposite the matrix holding surface, a portion of each rib being cut away at a point removed from the cut away portions of adjacent ribs to form a tortuous fluid passage, a filler plate abutting against the ribs, an inlet port adapted to introduce heating and cooling fluids connected with the outermost part of said passage, and an outlet port leading to a point diametrically opposite said inlet port.

3. A die holder having a portion with a surface adapted to hold a matrix, a plurality of concentric spaced ribs depending from the side of said portion opposite the matrix holding surface, a portion of each rib being cut away at a point diametrically opposite the cut away portions of adjacent ribs to form a tortuous fluid passage, a filler plate abutting against the ribs, an inlet port adapted to introduce heating and cooling fluids connected with the outermost part of said passage, and an outlet port leading to a point diametrically opposite said inlet port.

4. A die holder having a portion with a surface adapted to hold a matrix, a plurality of concentric spaced ribs depending from the side of said portion opposite the matrix holding surface, a portion of each rib being cut away at a point removed from the cut away portions of adjacent ribs to form a tortuous fluid passage, said ribs progressively increasing in depth toward the center of the device, a filler plate abutting against the ribs, an inlet port adapted to introduce heating and cooling fluids connected with the outermost part of said passage, and an outlet port leading to a point diametrically opposite said inlet port.

5. A die holder having a portion with a surface adapted to hold a matrix, a plurality of concentric spaced ribs depending from the side of said portion opposite the matrix holding surface, a portion of each rib being cut away at a point diametrically opposite the cut away portions of adjacent ribs to form a tortuous fluid passage, said ribs progressively increasing in depth toward the center of the device, a filler plate abutting against the ribs, an inlet port adapted to introduce heating and cooling fluids connected with the outermost part of said passage, and an outlet port leading to a point diametrically opposite said inlet port.

6. A die holder having a portion with a surface adapted to hold a matrix, a plurality of concentric spaced ribs depending from the side of said portion opposite the matrix holding surface, a portion of each rib being cut away at a point removed from the cut away portions of adjacent ribs to form a tortuous fluid passage, a filler plate abutting against the ribs, an inlet port adapted to introduce heating and cooling fluids connected with the outermost part of said passage, and an outlet passage from the center of the device to a point opposite the inlet port.

7. A die holder having a portion with a surface adapted to hold a matrix, a plurality of concentric spaced ribs depending from the side of said portion opposite the matrix holding surface, a portion of each rib being cut away at a point removed from the cut away portions of adjacent ribs to form a tortuous fluid passage, said ribs progressively increasing in depth toward the center of the device, a filler plate abutting against the ribs, an inlet port adapted to introduce heating and cooling fluids connected with the outermost part of said passage, and a downwardly inclined outlet passage from the center of the device to a point opposite the inlet port.

8. A die holder having a portion with a surface adapted to hold a matrix, a plurality of concentric spaced ribs depending from the side of said portion opposite the matrix holding surface, a portion of each rib being cut away at a point diametrically opposite the cut away portions of adjacent ribs to form a tortuous fluid passage, said ribs progressively increasing in depth toward the centre of the device, a filler plate abutting against the ribs, an inlet port adapted to introduce heating and cooling fluids connected with the outermost part of said passage, and a downwardly inclined outlet passage from the center of the device to a point opposite the inlet port.

9. A die holder having a portion with a surface adapted to hold a matrix, a plurality of concentric spaced ribs depending from the side of said portion opposite the matrix holding surface, a portion of each rib being cut away at a point removed from the cut away portions of adjacent ribs to form a tortuous fluid passage, an inlet port adapted to introduce heating and cooling fluids connected with the outermost part of said passage, and an outlet passage from the innermost part of the passage.

In witness whereof, I hereunto set my hand this 12th day of January 1920.

WILHELM B. BRONANDER.